Figure 1:
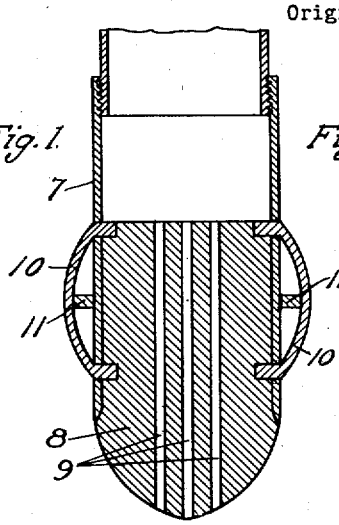
Figure 2:
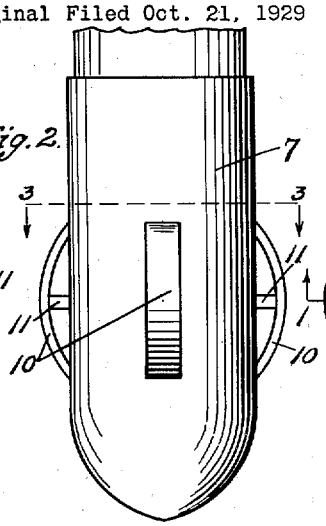
Figure 3:
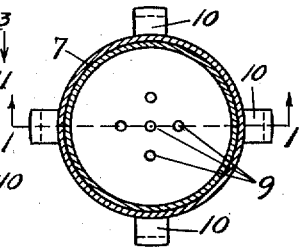

J. Q. LITTLE

CASING SHOE AND VALVE

Nov. 8, 1932. Re. 18,651

Original Filed Oct. 21, 1929

Inventor
John Q. Little

H. Litzenberg
Attorney

Reissued Nov. 8, 1932

Re. 18,651

UNITED STATES PATENT OFFICE

JOHN Q. LITTLE, OF WHITTIER, CALIFORNIA, ASSIGNOR TO BAKER OIL TOOLS, INC., OF HUNTINGTON PARK, CALIFORNIA, A CORPORATION OF CALIFORNIA

CASING SHOE AND VALVE

Original No. 1,786,761, dated December 30, 1930, Serial No. 401,144, filed October 21, 1929. Application for reissue filed March 7, 1931. Serial No. 520,910.

This invention relates to deep well equipment and particularly pertains to guiding, floating and cementing devices of the character used in connection with well casings for the purpose of guiding and floating the casing into place when it is being lowered into a deep well bore and which may afterwards be used during the cementing operation and then drilled up in such a way that the particles thereof may be removed from the bore by the circulating fluid. I am aware that prior to my invention guiding, floating and cementing devices of this character have been made of cast iron and of cementitious materials, but I wish to point out that there are many objections to these materials, chief among which is their fragile nature which results sometimes in the guide being broken prior to serving its complete function in guiding the casing into place.

It is the principal object of my invention to provide an improved casing shoe which is fitted with an improved guiding and floating plug which is not of a fragile nature but may easily be drilled out and removed from the bore by the circulating fluid and which has a guiding portion of tough yielding material so as to insure the presence of a guide at the lower end of a casing during the latter's entire travel down the bore.

I accomplish this object by providing a casing shoe fitted with a guiding and floating plug of tough resilient material such as vulcanized rubber which is durable enough to serve the purpose and which can be expeditiously drilled up after it has served its purpose.

Referring now in detail to the drawing, a casing shoe is designated 7, with a guide plug 8, formed therein. This plug is formed with passageways 9 therethrough. Four guide or spacing members 10 are arranged on the outside of the casing shoe with their ends inserted through the casing shoe and vulcanized into the body of the plug substantially as illustrated, with an intermediate brace piece 11 under each guide and centering member 10. The plug 8 is made of a suitable, durable resilient material which is non-fragile, such as vulcanized rubber, sufficiently firm to perform the guiding function and at the same time sufficiently resilient or yielding to yield under extreme pressure to permit matter to be forced through the passageways 9. The guide and centering members 10 are preferably made of the same material with their ends inserted through the side of the case and vulcanized into the body of the shoe, substantially in the manner indicated.

Figure 4:
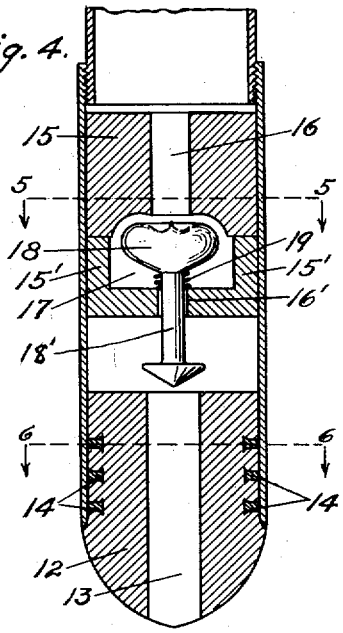

Referring to Fig. 4, I have shown a slightly modified form of device, designated 12, with a single passageway 13, therethrough, and secured in place by means of rings 14, of metal, secured inside of the casing shoe by welding or otherwise, and around which and secured to which the plug is formed and vulcanized.

Figure 5:
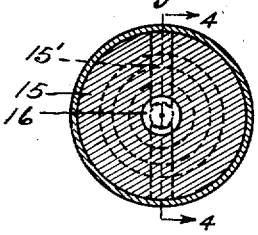
Figure 6:
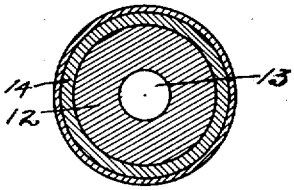

I have also shown a form of valve used to prevent back flow of the cement, and this comprises a body 15, having a passageway 16 therethrough, with a supporting yoke 15, secured to the underside of the body 15, forming between said yoke and said body a valve space 17, in which is placed a valve member 18, adapted to seat upwardly against the body 15, to prevent back flow through the passageway 16. Said valve 18 has a stem 18′ extending down through a passage 16 in the yoke 15, with a coiled spring 19 for normally holding said valve member and stem in the position shown in full lines, Fig. 4. The yoke 15 is indicated in broken lines in the sectional view, Fig. 5.

So far as I am aware, I am the first to conceive of the idea of making guiding and floating plugs of a non-fragile resilient material, as distinguished from such fragile materials as cast iron, cement and other very hard, brittle or friable material, whereby to secure a yielding function when needed, and which can also be drilled through readily and the particles eliminated from the casing in the usual way, and while I have shown one form or embodiment of the invention for descriptive purposes, I do not limit my invention except as I may be limited by the hereto appended claims.

Having thus described my invention, what I claim and desire to secure by Letters Patent is:

1. A casing shoe, a plug fitted thereto formed of resilient material with combination guide and centering members on the outside of the casing shoe and inserted through the casing shoe and into said casing plug and vulcanized thereto, for the purpose described.

2. A casing shoe, a plug fitted thereto and formed of rubber vulcanized into place and resilient, with passageways therethrough, said material being sufficiently yielding to permit under pressure the forcing of matter therethrough.

3. A casing shoe having a plug fitted thereto formed of vulcanized rubber, guide and centering members on the outside of the casing shoe with portions inserted through the side of the casing shoe and vulcanized into said plug, whereby said plug and said guide members are secured to said casing shoe.

4. A casing shoe including a plug formed of resilient material, guide and centering means on the outside of the casing shoe, said means extending through the side of the casing shoe into said plug to secure the plug in the shoe.

5. In combination with a well casing, a guide plug and combination guide and holding members on the outside of said casing and inserted therethrough into said plug for holding said plug in place within said casing, said plug and said guide and holding members being formed of vulcanized rubber and being yielding under pressure.

6. A guiding device for well casings comprising a casing shoe, a plug secured therein, said plug having a guiding portion extending below the lower end of the shoe, said guiding portion being formed of vulcanized rubber, said plug having fluid passageways formed therethrough, and valve means in the shoe preventing fluid from exterior of the shoe from entering the casing to which the shoe is connected.

7. A guiding device for well casings comprising a casing shoe, a plug in said shoe having a guiding portion projecting below the lower end of the shoe, said guiding portion being formed of non-metallic shock and fracture resistant material which can be readily drilled, and valve supporting means in said shoe spaced from said plug and formed of the same material as the plug, said plug and valve supporting means having a fluid passageway therethrough, a valve of the same material as said valve supporting means and supported thereby to permit passage of fluid downwardly through the shoe but not in an opposite direction.

JOHN Q. LITTLE.